United States Patent
Benedetti et al.

(10) Patent No.: US 9,154,465 B2
(45) Date of Patent: Oct. 6, 2015

(54) PROTECTING PRIVACY WHEN COMMUNICATING WITH A WEB SERVER

(71) Applicant: International Business Machines Corporation, Armonk, NY (US)

(72) Inventors: Fabio Benedetti, Rome (IT); Gianluca Mariani, Rome (IT); Riccardo Rossi, Rome (IT)

(73) Assignee: INTERNATIONAL BUSINESS MACIHNES CORPORATION, Armonk, NY (US)

( * ) Notice: Subject to any disclaimer, the term of this patent is extended or adjusted under 35 U.S.C. 154(b) by 282 days.

(21) Appl. No.: 13/649,706

(22) Filed: Oct. 11, 2012

(65) Prior Publication Data

US 2013/0104243 A1  Apr. 25, 2013

(30) Foreign Application Priority Data

Oct. 19, 2011  (EP) .................................... 11185712

(51) Int. Cl.
| | |
|---|---|
| *G06F 7/04* | (2006.01) |
| *G06F 15/16* | (2006.01) |
| *H04L 29/06* | (2006.01) |
| *H04L 9/32* | (2006.01) |

(52) U.S. Cl.
CPC ........... *H04L 63/0421* (2013.01); *H04L 9/3281* (2013.01); *H04L 63/0281* (2013.01); *H04L 63/08* (2013.01); *H04L 63/123* (2013.01)

(58) Field of Classification Search
CPC ... H04L 63/08; H04L 63/0281; H04L 63/123; H04L 9/3281
USPC .................. 726/26, 4, 12; 713/153, 161, 168
See application file for complete search history.

(56) References Cited

U.S. PATENT DOCUMENTS

| | | |
|---|---|---|
| 5,961,593 A | 10/1999 | Gabber et al. |
| 7,275,260 B2 | 9/2007 | De Jong et al. |
| 2004/0078593 A1 | 4/2004 | Hind et al. |

(Continued)

FOREIGN PATENT DOCUMENTS

| | | |
|---|---|---|
| DE | 102005034692 A1 | 2/2007 |
| DE | 102012218575 A1 | 4/2013 |

(Continued)

OTHER PUBLICATIONS

Rennhard, M., "MorphMix—A Peer-to-Peer-based System for Anonymous Internet Access," Swiss Federal Institute of Technology, Zurich, PhD. Thesis, Diss. ETH No. 15420, Apr. 2004, 306 pgs., retrieved from the Internet: <https://home.zhaw.ch/~rema/publications/PhDMorphMix.pdf>.

(Continued)

*Primary Examiner* — Aravind Moorthy
(74) *Attorney, Agent, or Firm* — Cuenot, Forsythe & Kim, LLC

(57) ABSTRACT

Protecting privacy when communicating with a web server via a communication network, includes receiving by a first privacy agent a request from an application program of a client system for a connection to a web server having a target web server address, sending the request together with a first identification from the first privacy agent to the second privacy agent, forwarding the request together with a second identification from the second privacy agent to the third privacy agent. Further processing is performed responsive to determining that the target web server address matches a defined web server address which is accessible by the third privacy agent.

23 Claims, 5 Drawing Sheets

(56) References Cited

U.S. PATENT DOCUMENTS

| | | | |
|---|---|---|---|
| 2005/0172120 A1 | 8/2005 | Wang et al. | |
| 2006/0075114 A1* | 4/2006 | Panasyuk et al. | 709/227 |
| 2006/0280191 A1 | 12/2006 | Nishida et al. | |
| 2009/0172171 A1 | 7/2009 | Amir | |

FOREIGN PATENT DOCUMENTS

| | | |
|---|---|---|
| GB | 2495797 B | 11/2013 |
| WO | 0235314 A2 | 5/2002 |

OTHER PUBLICATIONS

Liaqat, L. et al., "Anonymous Communication," Linkoping University, Dept. of Computer and Information Science, Information Security Project Report, 2007, 8 pgs., retrieved from the Internet: <http://citeseerx.ist.psu.edu/viewdoc/download?doi=10.1.1.131.2372&rep=rep1&type=pdf>.

Rezgui, A. et al., "Privacy on the Web: Facts, Challenges, and Solutions," IEEE Security & Privacy, vol. 1, No. 6, pp. 40-49, Nov.-Dec. 2003, retrieved from the Internet: <http://www.csun.edu/~deb53351/Papers/Rezgui__Privacy__on__the__web.pdf>.

Eyob, E., "Social Implications of Data Mining and Information Privacy: Interdisciplinary Frameworks and Solutions," Pennsylvania, Idea Group Inc., 2009, 323 pgs. [2 pgs. attached].

DE Appln. No. 102012218575.5, Office Action, May 14, 2014, 7 pg.

UK Patent Application No. GB1213090.2, Combined Search Report and Examination Report under Sections 17 and 18 (3), Nov. 19, 2012, 5 pgs.

* cited by examiner

PROTECTING PRIVACY WHEN COMMUNICATING WITH A WEB SERVER

CROSS-REFERENCE TO RELATED APPLICATIONS

This application claims the benefit of European Application Number 11185712.4 filed on 19 Oct. 2011, which is fully incorporated herein by reference.

BACKGROUND

The Internet is a well-known collection of networks (e.g., public and private data communication and multimedia networks) that work together (cooperate) using common protocols to form a worldwide network of networks.

The usage of the Internet has continuously grown since its early days. It has become an integral part of enterprises offering information and services to potential customers. Typically, such enterprises may set up a homepage on the worldwide web (a "web site"). The worldwide web may be understood as a logical overlay of the Internet. Each web site constitutes an electronically-addressable location. On the user side, client devices may be typically equipped with web-browsers to access the information offered on those web sites. The client devices may be anything being able to connect to the Internet, e.g., personal computers, netbook computers, notebook computers, smartphones, tablet computers, game consoles and many other devices including household devices and in-car computers as well as server computers.

An increasing number of web sites offer personalized services that may include "personalized web pages" customized to a user's interest. In order to track users' behavior or preferences that may go forth and back to/from a specific web site, session IDs, cookies and/or client computer identifiers, and/or browser identifiers may be stored by the server driving a specific web site.

Due to its predominance, the Internet or worldwide web has become a part of everyday life and there is nearly nothing a user cannot find when searching the web. However, this behavior may compromise user privacy. In particular, web sites, Internet service providers and many other parties may continuously collect data that even if the user is not fully identified, may violate a user's privacy. In particular, during the navigation of a web sites often times, data is being collected to create anonymous profiles of users. The data collected may be used for marketing purposes or to predict users' behaviors.

Several technologies have been developed in order to protect users' privacy when surfing the Internet. However, known systems for increasing privacy, when surfing the worldwide web or communicating with a web server, rely on central systems which typically function as proxy servers.

BRIEF SUMMARY

A method for protecting privacy when communicating with a web server via a communication network includes receiving by a first privacy agent using a processor a request from an application program of a client system for a connection to a web server having a target web server address, sending the request together with a first identification from the first privacy agent to the second privacy agent, forwarding the request together with a second identification from the second privacy agent to the third privacy agent. Responsive to determining that the target web server address matches a defined web server address which is accessible by the third privacy agent, sending the request from the third privacy agent with a third identification to the web server having the target web server address, receiving requested data from the web server having the target web server address by the third privacy agent, sending the received data from the third privacy agent to the second privacy agent, forwarding the received data from the second privacy agent to the first privacy agent, and forwarding the requested data from the first privacy agent to the application program.

A privacy system for protecting privacy when communicating with a web server over a communication network includes a first privacy agent unit having a first identification, a second privacy agent unit having a second identification, and a third privacy agent unit having a third identification. The first privacy agent unit is communicatively coupled to the second privacy agent unit. The second privacy agent unit is communicatively coupled to the third privacy agent unit. The system includes an application program that is communicatively coupled to the first privacy agent unit, a storage unit adapted for storing a defined web server address, a first receiving unit adapted for receiving by the first privacy agent unit a request from the application program for a connection to a web server having a target web server address, a first sending unit adapted for sending the request together with the first identification from the first privacy agent unit to the second privacy agent unit, and a first forwarding unit adapted for forwarding the request together with the second identification from the second privacy agent unit to the third privacy agent unit. The system includes a testing unit adapted for triggering the following units responsive to the defined web server address matching the target web server address, which is accessible by the third privacy agent unit: a second sending unit adapted for sending the request from the third privacy agent unit with the third identification to the web server having the target web server address, a second receiving unit adapted for receiving requested data from the web server having the target web server address by the third privacy agent unit, a third sending unit adapted for sending the received data from the third privacy agent unit to the second privacy agent unit, a second forwarding unit adapted for forwarding the received data from the second privacy agent unit to the first privacy agent unit, and a third forwarding unit adapted for forwarding the requested data from the first privacy agent unit to the application program.

A system for protecting privacy when communicating with a web server via a communication network includes at least one processor configured to initiate executable operations. The executable operations include receiving by a first privacy agent using a processor a request from an application program of a client system for a connection to a web server having a target web server address, sending the request together with a first identification from the first privacy agent to the second privacy agent, forwarding the request together with a second identification from the second privacy agent to the third privacy agent. The processor further performs, responsive to determining that the target web server address matches a defined web server address which is accessible by the third privacy agent, sending the request from the third privacy agent with a third identification to the web server having the target web server address, receiving requested data from the web server having the target web server address by the third privacy agent, sending the received data from the third privacy agent to the second privacy agent, forwarding the received data from the second privacy agent to the first privacy agent, and forwarding the requested data from the first privacy agent to the application program.

A computer program product for protecting privacy when communicating with a web server via a communication network. The computer program product includes a computer-readable storage medium having stored embodied therewith, the program code being executable by a processor to perform a method. The method includes receiving by a first privacy agent using a processor a request from an application program of a client system for a connection to a web server having a target web server address, sending the request together with a first identification from the first privacy agent to the second privacy agent, forwarding the request together with a second identification from the second privacy agent to the third privacy agent. Responsive to determining that the target web server address matches a defined web server address which is accessible by the third privacy agent, sending the request from the third privacy agent with a third identification to the web server having the target web server address, receiving requested data from the web server having the target web server address by the third privacy agent, sending the received data from the third privacy agent to the second privacy agent, forwarding the received data from the second privacy agent to the first privacy agent, and forwarding the requested data from the first privacy agent to the application program.

DETAILED DESCRIPTION

Figure 1:
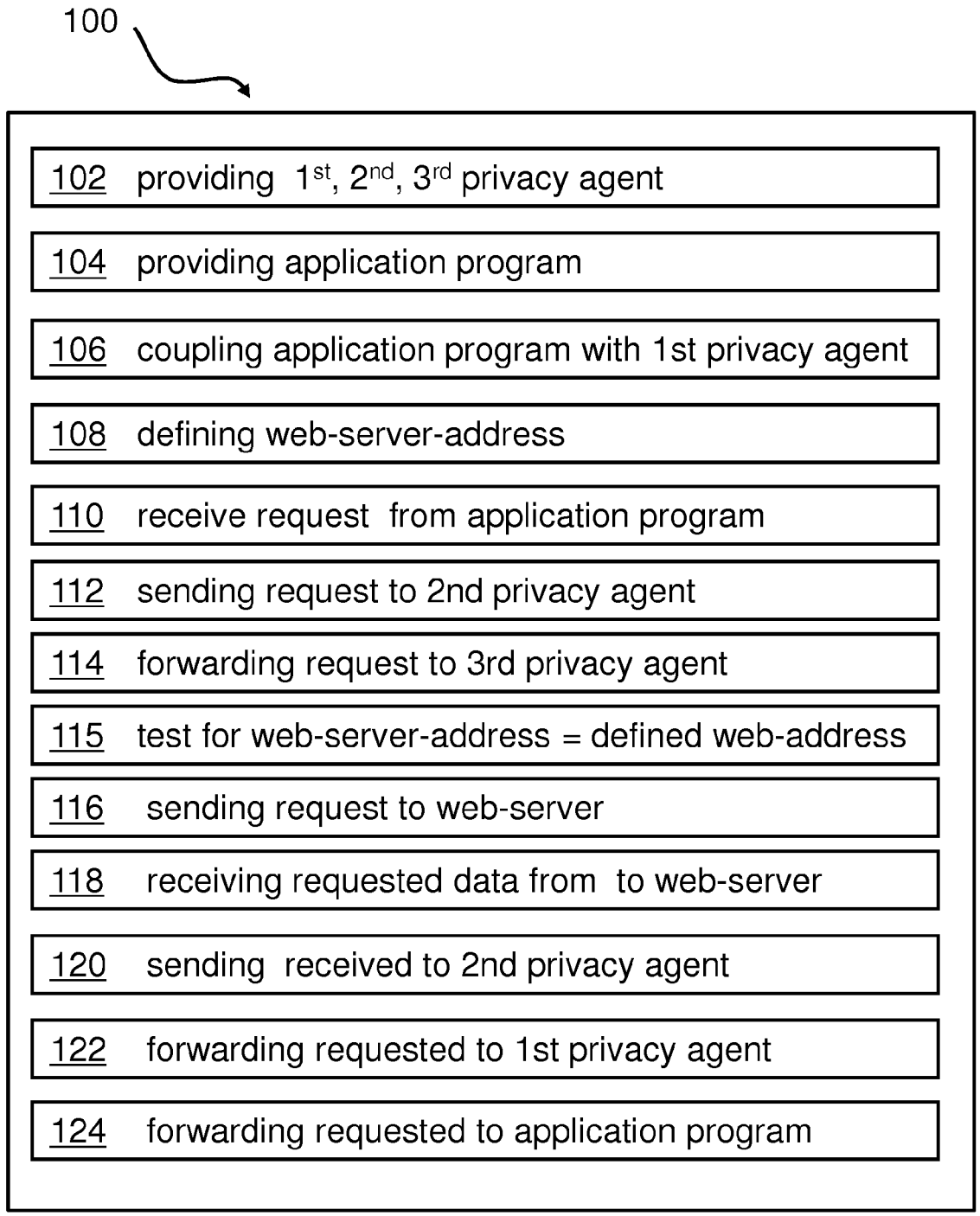
FIG. 1 shows a block diagram of an embodiment of the method for protecting privacy.

One or more embodiments of the invention relate generally to a method for protecting privacy when communicating with a web server.

One or more embodiments relate further to a privacy system for protecting privacy when communicating with a web server, a computer system network for an execution of the method for protecting privacy when communicating with a web server, a set of data processing programs, and a computer program product.

One or more embodiments provide an enhanced privacy protection system and a related method, which are independent of any central server system, and may also prevent uncovering identities of individual users surfing the web. One or more embodiments provide a method for protecting privacy when communicating with a web server via a communication network, a privacy system for protecting privacy, a computer system network, a set of data processing programs and a computer program product according to the independent claims.

In one embodiment, a method for protecting privacy when communicating with a web server via a communication network, in particular, the Internet, may be provided. The method may include providing a first privacy agent having a first identification, a second privacy agent having a second identification, and a third privacy agent having a third identification. The method may further include providing an application program, in particular a web-browser communicatively coupled to the first privacy agent. This first privacy agent may, in particular, run on the first client computer. Moreover, the method may include communicatively coupling the first privacy agent to the second privacy agent, and communicatively coupling the second privacy agent to the third privacy agent. This may be performed, in particular, such that the privacy agent may build a chained network or, a peer-to-peer network via underlying client computers. In such a peer-to-peer network, only neighbors may identify the identification of the next neighbor.

The method may further include defining a web server address, in particular a group of web server addresses, and receiving by the first privacy agent a request from the application program for a connection to a web server having a target web server address, sending the request together with the first identification from the first privacy agent to the second privacy agent, and forwarding the request together with the second identification from the second privacy agent to the third privacy agent.

In case the target web server address matches with the defined web server address which is accessible by the third privacy agent, the method may include sending the request from the third privacy agent with the third identification to the web server having the target web server address, receiving requested data from the web server having the target web server address by the third privacy agent, sending the received data from the third privacy agent to the second privacy agent, forwarding the received data from the second privacy agent to the first privacy agent, and forwarding the requested data from the first privacy agent to the application program. In case the application program is a web-browser, the requested data may, in particular, be displayed.

In another embodiment a privacy system for protecting privacy when communicating with a server via a communication network may be provided. The privacy system may include:

(-) a first privacy agent unit having a first identification, a second privacy agent unit having a second identification, and a third privacy agent unit having a third identification, wherein the first privacy agent unit is communicatively coupled to the second privacy agent unit and the second privacy agent unit is communicatively coupled to the third privacy agent unit, (-) an application program that is communicatively coupled to the first privacy agent unit, (-) a storage unit adapted for storing of a defined web server address, (-) a first receiving unit adapted for receiving by the first privacy agent unit a request from the application program for a connection to a web server having a target web server address, (-) a first sending unit adapted for sending the request together with the first identification from the first privacy agent unit to the second privacy agent unit, and (-) a forwarding unit adapted for forwarding the request together with the second identification from the second privacy agent unit to the third privacy agent unit.

A testing unit being adapted determining whether the defined web server address may match with the target web server address which may be accessible by the third privacy agent unit. In this case the following units may be triggered by the testing unit: (-) a second sending unit adapted for sending the request from the third privacy agent unit with the third identification to the web server having the target web server address, (-) a second receiving unit adapted for receiving requested data from the web server having the target web server address by the third privacy agent unit, (-) a third sending unit adapted for sending the received data from the third privacy agent unit to the second privacy agent unit, (-) a first forwarding unit adapted for forwarding the received data from the second privacy agent unit to the second privacy agent unit, and (-) a third forwarding unit adapted for forwarding the requested data from the first privacy agent unit to the application program.

It may be noted that the first, second and third privacy agent may, in particular, each run on a different client computer. It may also be understood that a peer-to-peer network included by the privacy agents may have no central point of control, i.e., there may be no central proxy server.

It may be noted that the first privacy agents may be linked to or run on a first client computer. The second privacy agent may be run on a second client computer and the third privacy agent may be run on a third client computer. The application program may in particular be a web-browser or, any other application program that may access information on the Internet.

It may also be noted that the coupling of the first privacy agent, the second privacy agent and the third privacy agent may be performed by coupling the underlying first, second, and third client computer in a peer-to-peer network. In such a network, only the next neighbors are known to each other and may address each other. Normally, a neighbor next to the next neighbor may not be known or directly addressable by the initial client computer. In this sense, the peer-to-peer network may be a chained network.

In the context of this application, the following conventions have been followed:

Privacy agent—The term privacy agent may denote a function, which may be implemented in hardware or software, residing on a client computer and controlling an information flow to and from an application program on the client computer to other privacy agents on other client computers. The privacy agent may, in particular, control an access of an application program like a web-browser to the Internet. It may allow direct Internet access via the client computer or via other privacy agents.

Identification—The term identification may denote a unique identifier in form of a character combination.

Communicatively coupled—This term may denote that two components—e.g., at least two computers, two other devices or two programs or a combination thereof—may exchange data between themselves. This may be direct or via other auxiliary components.

Web server address—A web server address may be given in the known form of an IP address as a 32-bit number using the Internet Protocol Version 4 (IPv4, or 128 bit for IPv6). This term may in this context also mean a Uniform Resource Locator (URL) or simply an Internet address of a resource on a web server accessible on the Internet.

Request—The term request may denote a request for data or information from a web server on the Internet.

Privacy—The term privacy may denote the circumstance that personal, or otherwise non public information may be hidden. In particular, a web server may not have access to data and information about a client computer or user data thereon from which a request has been initiated by a user. This may apply, in particular, to cookies, session ID and similar data of a requesting computer system.

Application program—The term application program may in this context denote a software program capable of being executed on a computer, e.g., a client computer in a peer-to-peer network. The application program may, e.g., be a web-browser adapted for initiating requests for information via the Internet. But also other programs may initiate requests to Internet resources.

The term "when communicating with a web server via a communication network" may in common speech be translated as "when surfing the web".

The above-described method for monitoring of stored procedures executed in a database management system may offer a couple of advantages.

The inventive method—as well as the privacy system—may propose a solution, which may leverage a peer-to-peer network to avoid correlating, storing and potentially miss-use user requests to web server addresses. The basic idea of the solution may be to spread or re-group web requests to various nodes of the peer-to-peer network. In this way, users may be protected from providing personal information to web sites about their preferences, web-surfing behaviors, personal tastes and/or other personal details. In particular, this solution may focus not only on making the requests anonymous, but mainly on preventing correlation of the information sent to avoid tracking of a user's behavior over a longer period of time. On the other hand, the proposed solution may let users be recognized on web sites, whenever it may be necessary, for example, during order processing or, in general, when an identification of a user may be required.

Thus, the proposed solution relies on privacy agents running on client computers or nodes of the peer-to-peer network. All web requests may first be processed by the privacy agent that may route the requests based on their content and destination to one of the network nodes which then may send the request out to the Internet. Each of the network nodes of the peer-to-peer network may be assigned to specific Internet sites based on request content or a predefined destination site address or group of site addresses. For example, one node may handle requests related to books or bookseller's web sites while another one may handle requests about travel information, again another one may handle requests about daily news or weather forecasts, etc.

When users may initiate a request, this request may be routed by the privacy agent or simply agent via the peer-to-peer network towards that node that will handle this request. This responsible node will contact the web server on behalf of the original clients and finally route back the response from the web server to the original client via the peer-to-peer network. This may be performed in a chained way via different nodes in the network or, in other words, by the privacy agents. In this way, many clients' requests may be mixed on the responsible node and the tracking activities of destination web sites may be unusable while statistical information could still be collected. For example, the node or client computer handling the request related to a bookseller web site, may execute requests on behalf of many other client computers of the peer-to-peer network. All these requests may go out to the Internet from a single client computer or privacy agent, which may have a unique cookie and/or session ID, such that a single user activity may not be traced back to the requesting client computer. The responsible client computer in the peer-to-peer network may perform a real client simulation of the originally requesting client computer, so cookies and session IDs may be handled locally by the responsible client, but responses, e.g., requested data, may be routed back to the original requesting client.

Hence, major advantage of this solution may be directed to protecting privacy while keeping a good navigation experience on the Internet. The proposed solution may not only make anonymous requests possible within the peer-to-peer-network, but may also focus on eluding server-level tracking mechanism like IP-address, session and cookies maintaining the web site functionalities. The proposed solution may also enable an automatic switch from privacy protection navigation to full session navigation helping users to navigate safely when security and authentication may be required. The peer-to-peer network may thus enhance the privacy level and avoid problems that are related to proxy servers.

In one embodiment of the method, the receiving of the request by the first privacy agent may include additionally sending the request by the first privacy agent to the web server together with an identification of a client computer on which the privacy agent and the application program run. The sending may be dependent on a direct access requirement flag. In particular, such a flag may be set automatically depending of predefined web server addresses or content related to the request. It may also be set depending on predefined SSL (Secure Socket Layer, often used as encryption method using the HTTPS protocol) requirements for predefined order processing web servers. If the sending the request may be performed directly from the client computer, a routing via the peer-to-peer network may not be required.

In another embodiment of the method, the direct access requirement flag is set based on a user input signal. This may have the advantage that the user has the full control over his privacy. He may decide to route the web server request via the peer-to-peer network ensuring privacy or to route the request directly to a web server without using the peer-to-peer network at all.

In again another embodiment of the method, the direct access requirement flag may be set based on a predefined web server address accessible by the first privacy agent. This method may have the advantage that requests to predefined addresses of web servers may automatically be routed via the peer-to-peer-network and under control of the privacy agents. Lists of these servers may be updated regularly for each privacy agent.

According to another embodiment of the method, the request may include an associated request identifier. This may enable a privacy agent to recognize a response from a web server that originates from a request of that specific privacy agent. The privacy agent may then be the end point to the forwarding process through the peer-to-peer network.

According to yet another embodiment of the method, the forwarding of the requested data from the second privacy agent to the first privacy agent is free of the third identification. This may guarantee that each privacy agent only "knows" that a request or a response may come from a neighboring peer in the network. Neither an origin of the request not the destination of the response may be identifiable for a middle-member of the peer-to-peer network.

In another preferred embodiment of the method, the forwarding of the requested data from the second privacy agent to the first privacy agent is performed together with sending also the second identification from the second privacy agent to the first privacy agent. This may identify neighboring peers in the network.

According to an alternative embodiment of the method, and in case the first privacy agent may not send the requested data to the application program within a predefined time, sending the request together with the first identification to another second privacy agent which is also communicatively coupled to the first privacy agent. This may ensure that the user experience when surfing the web may not be negatively influenced. It may well be that no node may have the target web server address in its corresponding web server list. In such a case, the request may never be fulfilled. The privacy agent may have another next neighbor such that the request may be sent via this route. Alternatively, the request may go out directly to the Internet from the requesting privacy agent or the direct access flag (see above) may be set to enable such a direct access.

In another embodiment of the method, the first privacy agent, the second privacy agent and the third privacy agent form a peer-to-peer network. A network setup of this kind has already been discussed above. The peer-to-peer network may be organized as a logical ring or it may have other topologies. It may, e.g., be possible that a client may have more than one or two next neighbors.

It should be noted that embodiments of the invention may take the form of an entire hardware implementation, an entire software embodiment or, an embodiment containing both, hardware and software elements. In a preferred embodiment, the invention is implemented in software, which may include, but may not be limited to, firmware, resident software and microcode.

According to another aspect of the invention, a set of data processing programs for execution in data processing systems may be provided comprising software code portions for performing the method, as described above, when the set of programs may be run on data processing systems. Each of the data processing systems may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All illustrations in the figures are schematic. Firstly, a block diagram for an embodiment of the method for protecting privacy will be described. Afterwards, embodiments of the method and privacy system for protecting privacy will be described.

FIG. 1 shows a block diagram 100 of an embodiment of the method for protecting privacy. The method steps may include providing, 102, a first privacy agent having a first identification, a second privacy agent having a second identification, and a third privacy agent having a third identification. Next, an application program, e.g., a web-browser may be provided, 104, and communicatively coupled to the first privacy agent. Both, the first privacy agent and the application program may run on a client computer. Also, the first privacy agent may be communicatively coupled, 106, to the second privacy agent as well as the second privacy agent to the third privacy agent, such that a chained peer-to-peer network may be build via underlying client computers. Only next neighbors may be identifiable by a client computer. Additionally, a web server address or a group of web server addresses may be defined, 108. The addresses may be stored in a list or the like accessible to a privacy agent. The first privacy agent may receive, 110, a request from the application program for a connection to a web server having a target web server address. This request may be sent, 112, together with the first identification from the first privacy agent to the second privacy agent. The request together with the second identification may be forwarded, 114, from the second privacy agent to the third privacy agent. In case, 115, the target web server address matches with the defined web server address which may be accessible by the third privacy agent, the request may be sent, 116, from the third privacy agent with the third identification to the web server having the target web server address. Consequently, requested data from the web server having the target web server address by the third privacy agent may be received, 118, and be sent, 120, from the third privacy agent to the second privacy agent. Then, the received data may be forwarded, 122, from the second privacy agent to the first privacy agent, and finally, the requested data may be forwarded, 124, from the first privacy agent to the application program. Here, the received data may be displayed.

Figure 2:
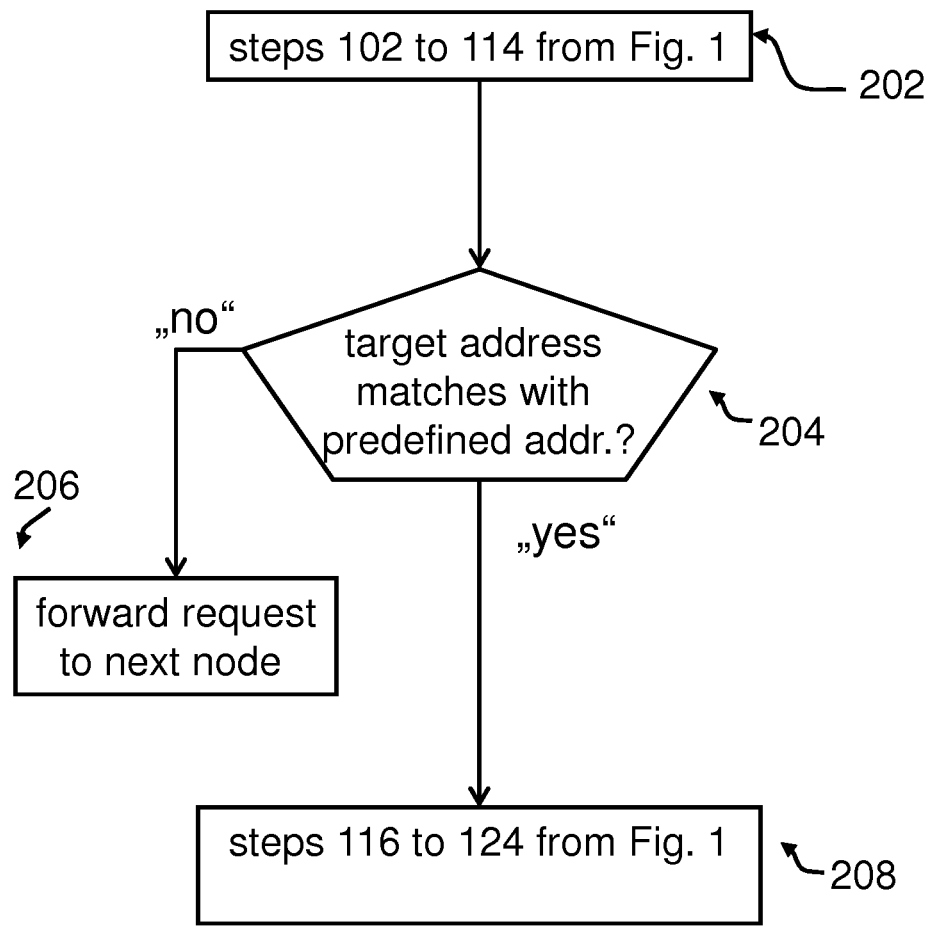
FIG. 2 shows a block diagram of a detail of an embodiment of the method for protecting privacy.

It may be noted that after steps 102 to 114 of FIG. 1—reference numeral 202 in FIG. 2—a decision 204, has to be made by every privacy agent, having received the request in the chain of privacy agents, whether there may be a known defined web server address and whether this defined address may match with the target web server address. If the answer may be "yes", the privacy agent may request the information from the targeted web server and proceed according to the method described above—as summarized by reference numeral 208 with reference to FIG. 1. In case the answer may be "no", the request may be forwarded, 206, to the next privacy agent, and so on.

Figure 3:
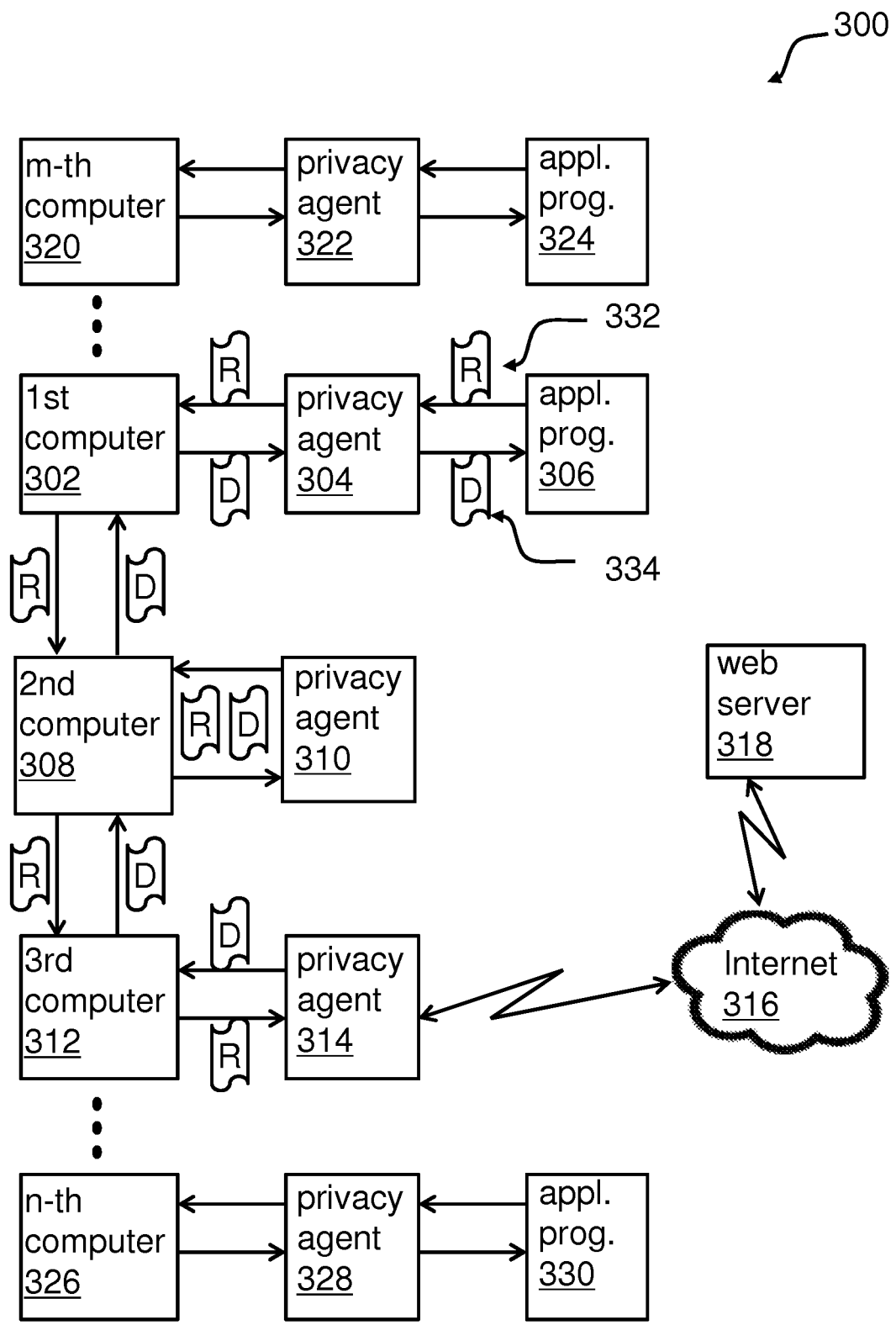
FIG. 3 shows a block diagram of required components for one embodiment of the inventive method.

FIG. 3 shows a block diagram 300 of required components for one embodiment of the inventive method. A series of client computers 302, 308, 312, 320, 326 may be shown. They all may be part of a peer-to-peer network. Technologies for peer-to-peer networks may be well-known to a person skilled in the art. A first privacy agent 304 may run on the first client computer 302. The first privacy agent 304 may be communicatively coupled to an application program 306. This application program 306 may be a web-browser. Alternatively, the application program 306 may be any other application that may require an access to the Internet. Additionally, a second client computer 308 running a second privacy agent 310, as well as a third client computer 312 with an associated third privacy agent 314 are shown. The third privacy agent 314 may—via elements of the third client computer 312—have access to the Internet 316, to which also a web server 318 may be connected. Application programs that may communicatively be coupled to the second privacy agent 310 and the third privacy agent 314 may not be shown on this diagram. Other client computers 320, 326, which may also be part of the peer-to-peer network, may all have their own privacy agents 322, 328 and may all run individual application programs 324, 330. In addition to the elements shown on this diagram, also "traveling" requests 332 symbolized by an "R" and "traveling" data 334, symbolized by "D" may be shown.

A request 332 may be generated by the application program 306 and sent to the privacy agent 304. From here, the request may be sent via the first client computer 302 and via the second client computer 308 to the second privacy agent 310. The request may be sent with an identification of the first privacy agent 304 to the second privacy agent 310. Additionally, the request may include a request identification, which may have been generated by the first privacy agent.

The second privacy agent 310 may send the request together with an identification of the second privacy agent to the third client computer 312, third privacy agent 314, respectively. Here, the third privacy agent 314 might find a match of the web address corresponding to the request with a listed web address accessible to the third privacy agent on the third client computer. Such a list may define web addresses. All requests reaching the third client computer and the third privacy agent that match an element in such a list, may be sent to the Internet 316 from the third client computer 312. If requested data may come back from the web server 318 via the Internet 316 to the third privacy agent 314, the data may be enhanced by the request identification and may be sent via the third client computer 312 into the peer-to-peer network. Computers, respectively privacy agents not recognizing the request ID, may only store and forward the data to the next client computer/the next privacy agent in the peer-to-peer network chain. If the data together with the request identification may reach the first client computer 312/the first privacy agent 314, respectively, the data may be sent to the application program. In case the application program 306 may be a browser, the data may be displayed.

Consequently, the web server will not be aware of the original requester, in particular, the application program 306 or the operating user of the application program 306. All session IDs, cookies or other identifiable data may be related to the third client computer 312 or the third client privacy agent 314, respectively. Thus, the privacy of the user using the application program 306 is not only protected against the provider and operator of the web server 318 but also against other members of the peer-to-peer network.

Other client computers may have another list including other web addresses such that they operate as a collection point for requests to predefined web servers. Consequently, every member of the peer-to-peer network may be an access point to the Internet for an individually predefined and pre-specified list of web servers.

The peer-to-peer network built by the client computers 302, 308, 316 and many more (reference numeral 326, 320 as representatives) may also be organized in a ring structure. It may also be possible that the first client computer 202 is not only connected to two other client computers, but also to a plurality of other client computers. Thus, it may be possible, if a timeout occurs on one route, the client computer may have sent a request, that another route via another "second client computer" may be tried.

The lists, specifying specific web server addresses that may be stored on different client computers and that may be used by the respective privacy agent, may not only be predefined. They may also be generated automatically based on predefined topics. If a topic may be "bookstore", the list may be automatically generated in such a way that web server addresses of online web sellers may be included in the list. This way, the list may be updated automatically over time. Hence, it may be a dynamic list and not a static list.

There may also be a "default client computer" in the peer-to-peer network. A request may go via this "default client computer" via the Internet to all those web servers having web server addresses that may not have been specified in any on the lists residing on the client computers in the peer-to-peer network.

It may also be noted that a user operating the application program 306—e.g., a web browser—may decide not to use the privacy protection when surfing the web. Based on a user command, the first privacy agent 304 may direct the request via the first client computer 302 directly via the Internet 316 to the specified or target web server 318. This may, e.g., be the case if a full identification or authentication may be required. This may for example be the case for order processing purposes. Another example may be an access of a user to a company web site allowing access to an enterprise network of the user's employer.

The situation to allow a full session control may also be detected automatically. In particular, when an SSL connection may need to be established, the respective privacy agent may not route requests through the peer-to-peer network, but the privacy agent may connect the application program 306 via the first client computer directly to the web server. In other situations, in which privacy might not be strictly required, a user may fill in an electronic form for e.g., and order process. In this case, a browser plug-in may detect the situation and may ask the user to interact directly with the web site. In a more sophisticated access control method, the client computer, the privacy agent respectively, may also give the possibility to get back to current cookies for a specific client, avoiding navigation disruption during the navigation experience.

Figure 4:
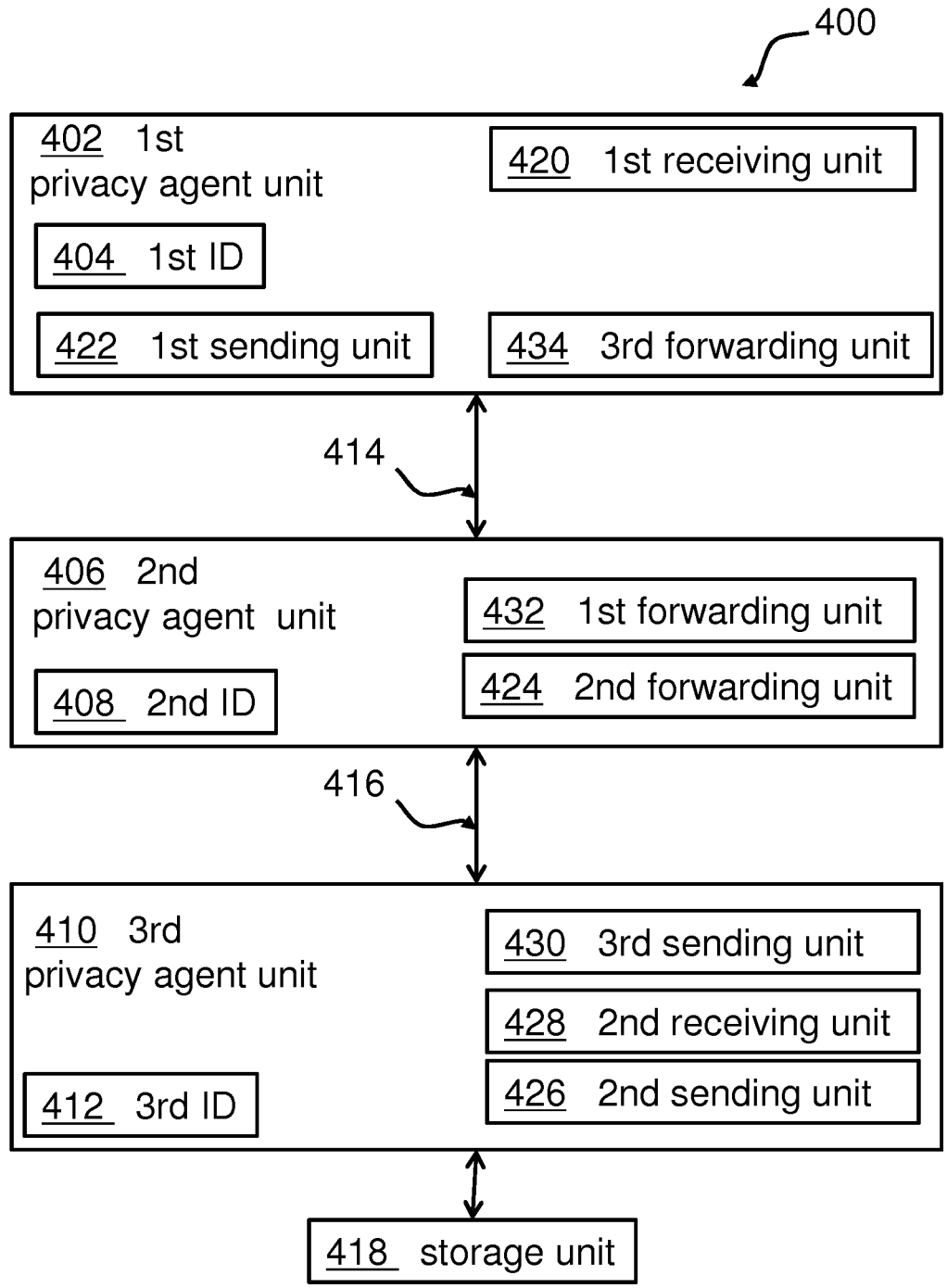
FIG. 4 shows a block diagram of components of an embodiment of the privacy system for protecting privacy.

FIG. 4 shows a block diagram of components of an embodiment of the privacy system 400 for protecting privacy when communicating with a web server over a communication network. The privacy system 400 may include a first privacy agent unit 402 having a first identification 404, a second privacy agent unit 406 having a second identification 408, and a third privacy agent unit 410 having a third identification 412. Each unit may be a component of a different client computer (not shown in FIG. 4). The first privacy agent unit 402 may be communicatively coupled to the second privacy agent unit 406 and the second privacy agent unit 406 may be communicatively coupled to the third privacy agent unit 410. An application program may be communicatively coupled to the first privacy agent unit 402. A storage unit 418 may be adapted for storing of a defined web server address, in particular, in the third privacy agent unit 410. It may be clear that every privacy agent unit may have access to a similar, separate storage unit.

A first receiving unit 420 may be adapted for receiving by the first privacy agent unit 402 a request from the application program for a connection to a web server having a target web server address. A first sending unit 422 adapted for sending the request together with the first identification from the first privacy agent unit 402 to the second privacy agent unit 406. A first forwarding unit may be adapted for forwarding the request together with the second identification from the second privacy agent unit 406 to the third privacy agent unit 410.

A testing unit may be adapted for triggering the following units in case the defined web server address matches with the target web server address which is accessible by the third privacy agent unit 410. A second sending unit 426 may be adapted for sending the request from the third privacy agent unit 410 with the third identification 412 to the web server having the target web server address. A second receiving unit 428 may be adapted for receiving requested data from the web server having the target web server address by the third privacy agent unit 410. A third sending unit 430 may send the received data from the third privacy agent unit 410 to the second privacy agent unit 406. There, a second forwarding unit 432 may forward the received data from the second privacy agent 406 to the first privacy agent unit 402, and a third forwarding unit 434 may forward the requested data from the first privacy agent unit 402 to the application program.

Figure 5:
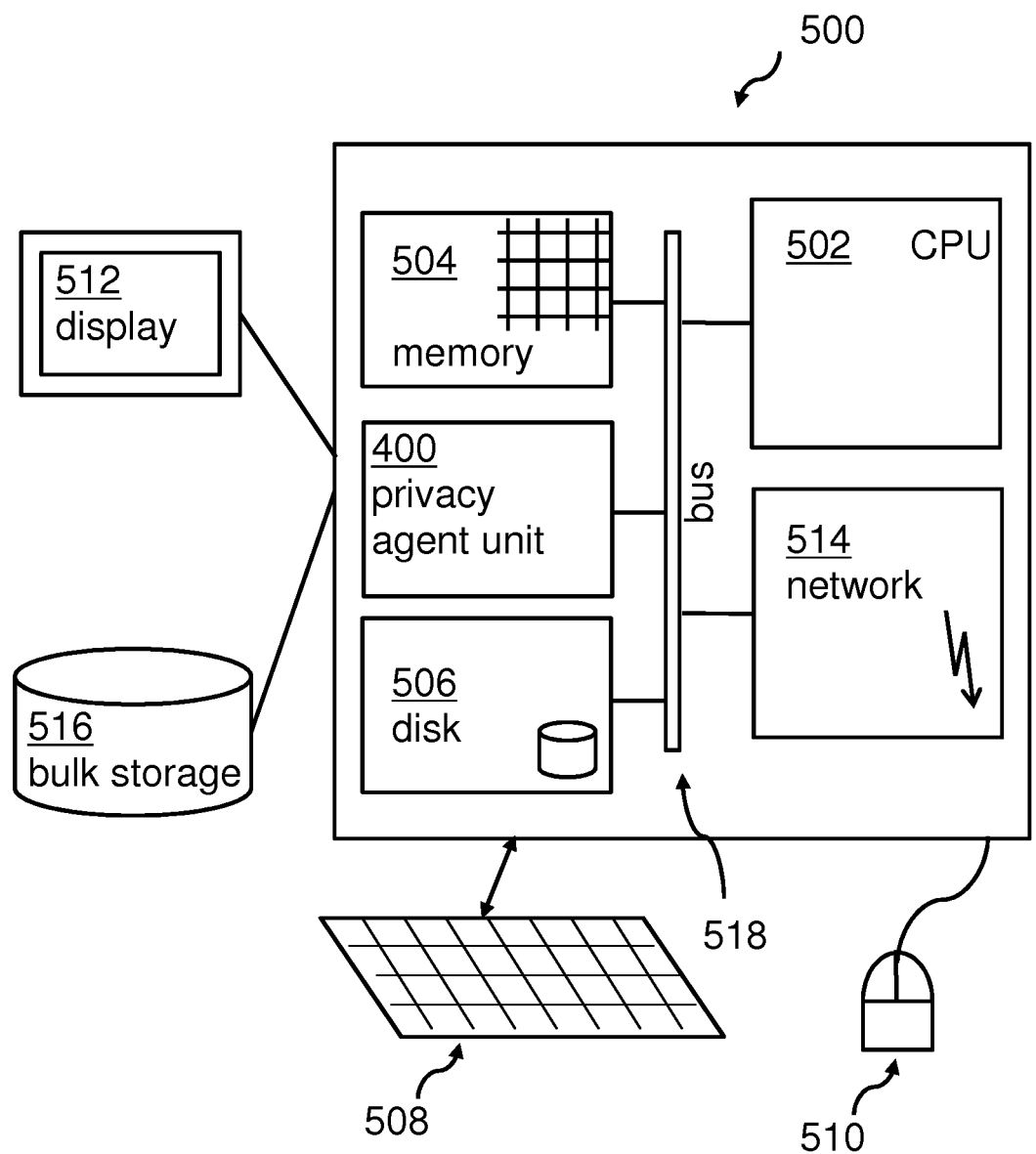
FIG. 5 shows a block diagram of a client computer that may represent an embodiment of a node of the underlying peer-to-peer network.

Embodiments of the invention may be implemented on virtually any type of computer, regardless of the platform being used suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, a privacy agent unit 400 may be attached to the system bus 518.

The computer system 500 may also include input means, such as a keyboard 508, a mouse 510, or a microphone (not shown). Furthermore, the computer 500, may include output means, such as a monitor 512 [e.g., a liquid crystal display (LCD), a plasma display, a light emitting diode display (LED), or cathode ray tube (CRT) monitor]. The computer system 500 may be connected to a network, e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the afore-mentioned input and output means may take other forms. Generally speaking, the computer system 500 may include at least the minimal processing, input and/or output means, necessary to practice embodiments of the invention.

Further, those skilled in the art will appreciate that one or more elements of the afore-mentioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While aspects of the invention have been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method for protecting privacy when communicating with a web server via a communication network, the method comprising:
   receiving by a first privacy agent using a processor a request from an application program of a client system for a connection to a web server having a target web server address;
   sending the request together with a first identification from the first privacy agent to the second privacy agent;
   forwarding the request together with a second identification from the second privacy agent to the third privacy agent;
   responsive to determining that the target web server address matches a defined web server address which is accessible by the third privacy agent:
   sending the request from the third privacy agent with a third identification to the web server having the target web server address;
   receiving requested data from the web server having the target web server address by the third privacy agent;
   sending the received data from the third privacy agent to the second privacy agent;
   forwarding the received data from the second privacy agent to the first privacy agent; and
   forwarding the requested data from the first privacy agent to the application program.

2. The method according to claim 1, wherein the receiving of the request by the first privacy agent comprises:
   sending the request by the first privacy agent to the web server together with an identification of a client computer on which the first privacy agent and the application program run, the sending being dependent on a direct access requirement flag.

3. The method according to claim 2, wherein the direct access requirement flag is set based on a user input signal.

4. The method according to claim 1, wherein the direct access requirement flag is set based on a predefined web server address accessible by the first privacy agent.

5. The method according to claim 1, wherein the request comprises an associated request identifier.

6. The method according to claim 1, wherein the forwarding of the requested data from the second privacy agent to the first privacy agent is free of the third identification.

7. The method according to claim 1, wherein the forwarding of the requested data from the second privacy agent to the first privacy agent is performed together with sending also the second identification from the second privacy agent to the first privacy agent.

8. The method according to claim 1, wherein, in case the first privacy agent does not send the requested data to the application program within a predefined time, sending the request together with the first identification to another second privacy agent which is also communicatively coupled to the first privacy agent.

9. The method according to claim 1, wherein the first privacy agent, the second privacy agent and the third privacy agent form a peer-to-peer network.

10. A system for protecting privacy when communicating with a web server via a communication network, the system comprising:
    at least one processor configured to initiate executable operations comprising:
    receiving by a first privacy agent using a processor a request from an application program of a client system for a connection to a web server having a target web server address;
    sending the request together with a first identification from the first privacy agent to the second privacy agent;
    forwarding the request together with a second identification from the second privacy agent to the third privacy agent;
    responsive to determining that the target web server address matches a defined web server address which is accessible by the third privacy agent:
    sending the request from the third privacy agent with a third identification to the web server having the target web server address;
    receiving requested data from the web server having the target web server address by the third privacy agent;
    sending the received data from the third privacy agent to the second privacy agent;
    forwarding the received data from the second privacy agent to the first privacy agent; and
    forwarding the requested data from the first privacy agent to the application program.

11. The system according to claim 10, wherein the receiving of the request by the first privacy agent comprises:
    sending the request by the first privacy agent to the web server together with an identification of a client computer on which the first privacy agent and the application program run, the sending being dependent on a direct access requirement flag.

12. The system according to claim 11, wherein the direct access requirement flag is set based on a user input signal.

13. The system according to claim 10, wherein the direct access requirement flag is set based on a predefined web server address accessible by the first privacy agent.

14. The system according to claim 10, wherein the request comprises an associated request identifier.

15. The system according to claim 10, wherein the forwarding of the requested data from the second privacy agent to the first privacy agent is free of the third identification.

16. The system according to claim 10, wherein the forwarding of the requested data from the second privacy agent to the first privacy agent is performed together with sending also the second identification from the second privacy agent to the first privacy agent.

17. The system according to claim 10, wherein, in case the first privacy agent does not send the requested data to the application program within a predefined time, sending the request together with the first identification to another second privacy agent which is also communicatively coupled to the first privacy agent.

18. The system according to claim 10, wherein the first privacy agent, the second privacy agent and the third privacy agent form a peer-to-peer network.

19. A computer program product for protecting privacy when communicating with a web server via a communication network, the computer program product comprising:
  a computer-readable storage medium having stored embodied therewith, the program code being executable by a processor to perform a method comprising:
  receiving by a first privacy agent using a processor a request from an application program of a client system for a connection to a web server having a target web server address;
  sending the request together with a first identification from the first privacy agent to the second privacy agent;
  forwarding the request together with a second identification from the second privacy agent to the third privacy agent;
  responsive to determining that the target web server address matches a defined web server address which is accessible by the third privacy agent:
  sending the request from the third privacy agent with a third identification to the web server having the target web server address;
  receiving requested data from the web server having the target web server address by the third privacy agent;
  sending the received data from the third privacy agent to the second privacy agent;
  forwarding the received data from the second privacy agent to the first privacy agent; and
  forwarding the requested data from the first privacy agent to the application program, wherein
  the computer-readable storage medium is a hardware apparatus that does not consist of a transitory, propagating signal.

20. The computer program product according to claim 19, wherein the receiving of the request by the first privacy agent comprises:
  sending the request by the first privacy agent to the web server together with an identification of a client computer on which the first privacy agent and the application program run, the sending being dependent on a direct access requirement flag.

21. The computer program product according to claim 19, wherein the forwarding of the requested data from the second privacy agent to the first privacy agent is free of the third identification.

22. The computer program product according to claim 19, wherein the forwarding of the requested data from the second privacy agent to the first privacy agent is performed together with sending also the second identification from the second privacy agent to the first privacy agent.

23. The computer program product according to claim 19, wherein, in case the first privacy agent does not send the requested data to the application program within a predefined time, sending the request together with the first identification to another second privacy agent which is also communicatively coupled to the first privacy agent.

* * * * *